United States Patent
Lee et al.

(10) Patent No.: US 8,619,032 B2
(45) Date of Patent: Dec. 31, 2013

(54) MOUSE STRUCTURE WITH RETRACTING FUNCTION

(75) Inventors: Tsung-Shih Lee, New Taipei (TW); Shih-Chuan Li, New Taipei (TW)

(73) Assignee: Cheng Uei Precision Industry Co., Ltd., New Taipei (TW)

( * ) Notice: Subject to any disclaimer, the term of this patent is extended or adjusted under 35 U.S.C. 154(b) by 143 days.

(21) Appl. No.: 13/401,822

(22) Filed: Feb. 21, 2012

(65) Prior Publication Data
US 2013/0215030 A1  Aug. 22, 2013

(51) Int. Cl.
*G09G 5/08* (2006.01)

(52) U.S. Cl.
USPC .......................................... 345/163

(58) Field of Classification Search
USPC ................. 345/163, 164, 166; 463/37–38
See application file for complete search history.

(56) References Cited

U.S. PATENT DOCUMENTS

| | | | |
|---|---|---|---|
| 6,304,249 B1* | 10/2001 | Derocher et al. | 345/163 |
| 2003/0103040 A1* | 6/2003 | Koike et al. | 345/163 |
| 2003/0169236 A1* | 9/2003 | Crocker | 345/168 |
| 2010/0007607 A1* | 1/2010 | Li | 345/163 |
| 2010/0053084 A1* | 3/2010 | Chatterjee et al. | 345/163 |
| 2011/0310016 A1* | 12/2011 | Zucker et al. | 345/163 |

\* cited by examiner

*Primary Examiner* — Chanh Nguyen
*Assistant Examiner* — Jonathan Blancha
(74) *Attorney, Agent, or Firm* — Cheng-Ju Chiang

(57) ABSTRACT

A mouse structure including a housing having a base portion, and a tongue portion having a guiding slot and at least a sliding channel; a first sliding device; a second sliding device including a base board, a sliding element, and a resilient apparatus having a pivoting end rotatably connected to the base board, a connecting bar connected to the sliding element, and a resilient portion; a linking element having a first linking portion fastened with the first sliding device, and a second linking portion fixedly attached to the sliding element, wherein when the first sliding device is being pulled or pushed, the linking element moves in conjunction with the first sliding device and drives the sliding element sliding on the base board, whereby the resilient apparatus rotates in conjunction with the sliding element to enable the sliding element to move between first and second positions.

10 Claims, 5 Drawing Sheets

MOUSE STRUCTURE WITH RETRACTING FUNCTION

BACKGROUND OF THE INVENTION

1. Field of the Invention

The present invention relates to a mouse, and particularly to a mouse structure that is retractable, less space occupied when not in use, and easy to use.

2. Related Art

Types and shapes of mice are many and various. Whatever the type or shape of a conventional mouse has its own physical size which occupies a certain space whenever it is in use or not. Although a mouse can be designed as small size, they are merely suitable for users of smaller palms but not for most users. Hence a mouse is improved to have a retractable portion for being retractable into a casing of the mouse to reduce the size when not in use. However, no matter the retractable portion is being retracted in or pulled out of the mouse, it is required to apply a certain force during the whole process of retracting and pulling the retractable portion in place, and it is strength-consuming and rather inconvenient in use. Therefore, it is imperative to overcome the aforesaid drawbacks of the conventional mouse by improving it to be less-space occupied and easy use.

SUMMARY OF THE INVENTION

Accordingly, an object of the present invention is to provide a mouse structure having a retractable structure and a resilient apparatus for being reducible in size and easy to use.

To achieve the above-mentioned object, a mouse structure of the present invention comprises a housing having a base portion and a tongue portion extending from one end of the base portion, the base portion defining an accommodating space therein, the tongue portion having a guiding slot and at least a sliding channel, the guiding slot and the at least a sliding channel communicating with the accommodating space; a first sliding device capable of sliding along and fitting together with the tongue portion; a second sliding device comprising a base board, a sliding element, and a resilient apparatus rotatably disposed between the base board and the sliding element, the base board fixedly disposed on the base portion, the sliding element slidably mounted on the base board and capable of sliding between a first position and a second position, the resilient apparatus having a pivoting end, a connecting bar, and a resilient portion disposed between the pivoting end and connecting bar, the pivoting end being rotatably connected to the base board, the connecting bar connected to the sliding element; and a linking element having first and second linking portions, one end of the first linking portion being fastened with the first sliding device over the at least a sliding channel, the second linking portion fixedly attached to the sliding element, the first linking portion capable of moving along the guiding slot in conjunction with the first sliding device; and a cover covering a top of the housing.

With the above-mentioned structure, when the first sliding device is in a close state that the first sliding device completely fits into the tongue portion, the sliding element is located at the first position, and when the first sliding device is being pulled to slide a first slide distance, the linking element moves in conjunction with the first sliding device and drives the sliding element sliding towards the second position, and meanwhile the resilient apparatus rotates about the pivoting end in conjunction with the sliding element, the resilient portion therefore being compressed and deformed by the connecting bar until after the resilient apparatus rotates a predetermined curve path, the sliding element being pushed by the connecting bar when the resilient portion is not compressed and whereby the first sliding device automatically sliding a second sliding distance, and the sliding element reaching the second position. Accordingly, the mouse structure is easy to use by applying a less force to pull of push the first sliding device only at the beginning of the whole process of the first sliding device sliding along the tongue portion.

DESCRIPTION OF THE PREFERRED EMBODIMENTS

Figure 1:
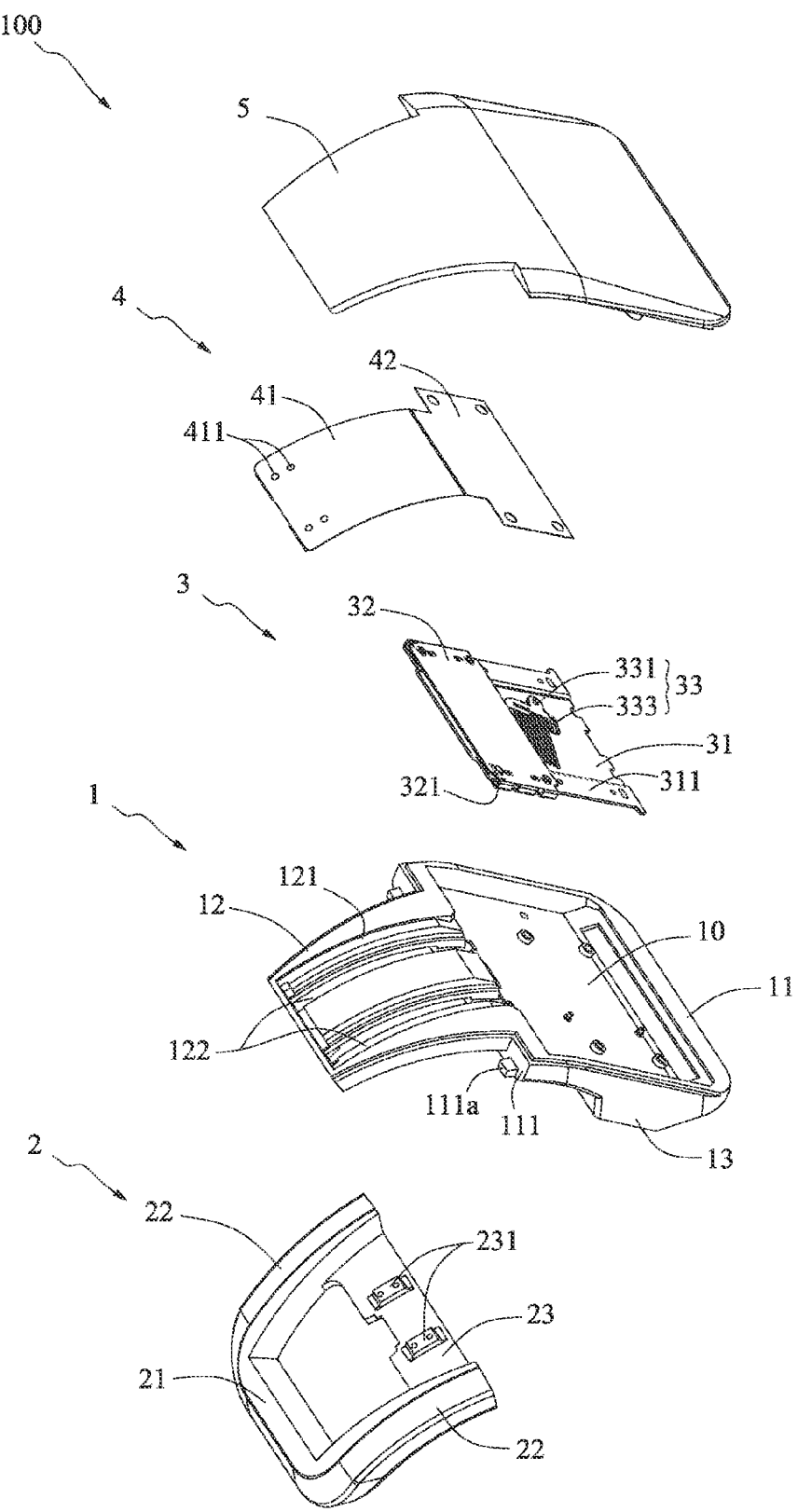
FIG. 1 is an exploded perspective view of a mouse structure of the present invention.
Figure 2:
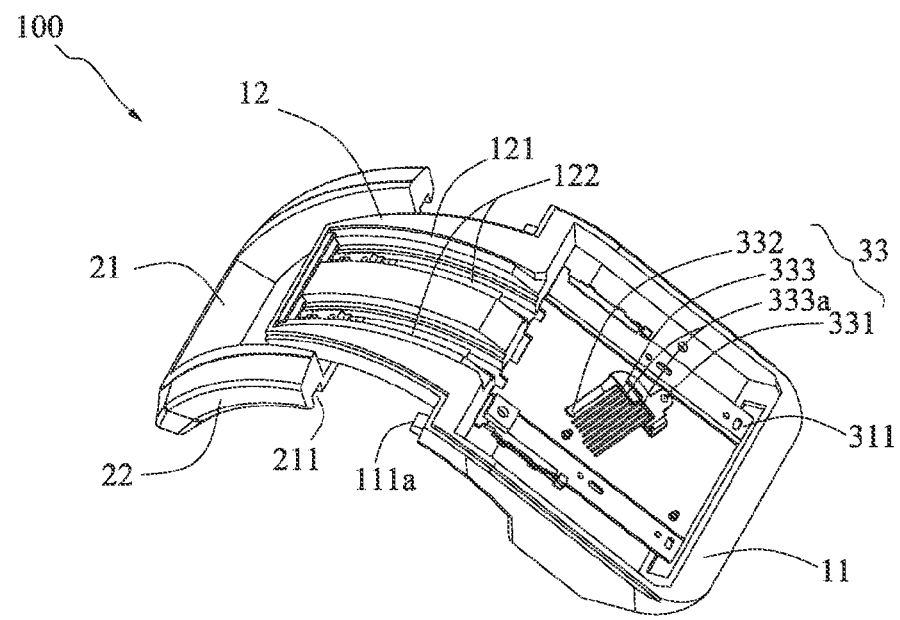
FIG. 2 is a partially assembly view of the mouse structure with a linking element and a case being removed.
Figure 3:
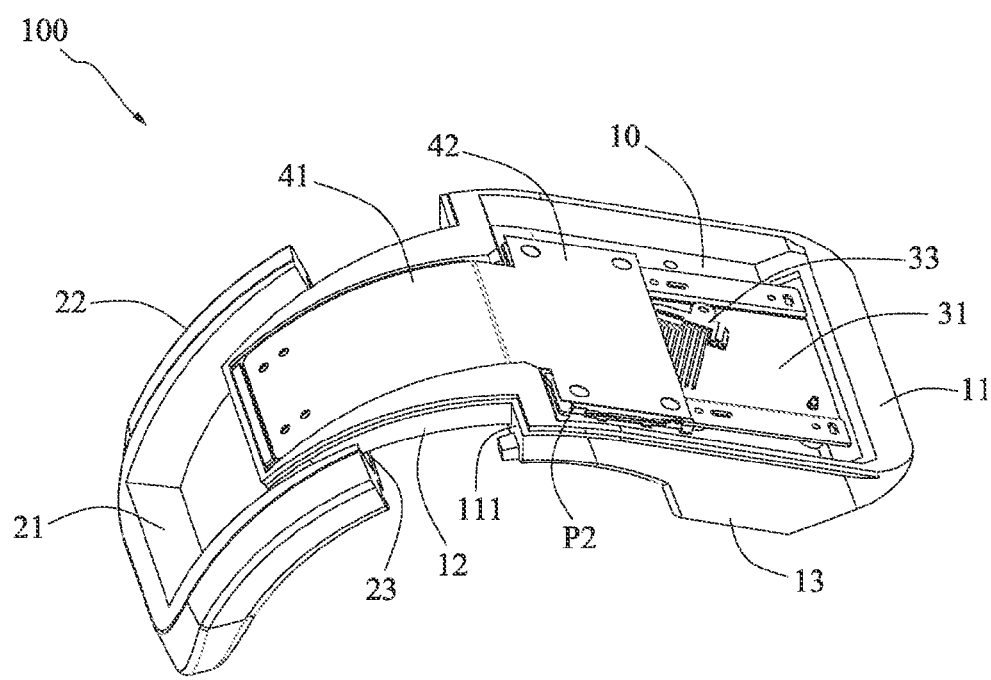
FIG. 3 is a partially assembly view of the mouse structure with the case being removed.
Figure 4:
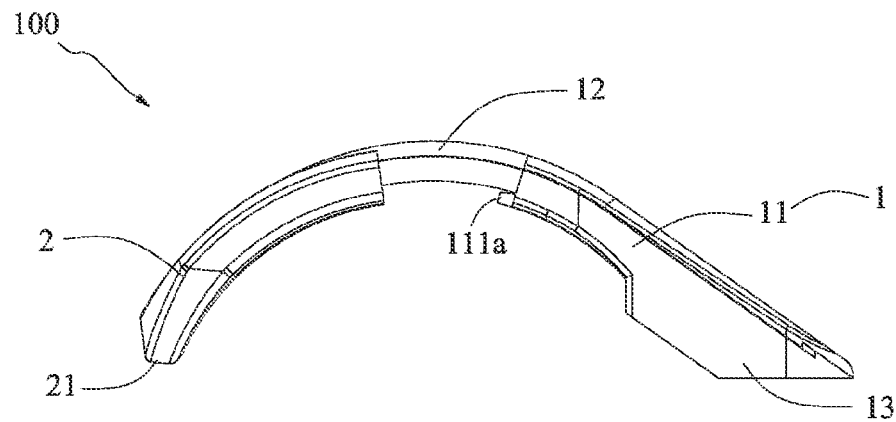
FIG. 4 is a right side elevation view of FIG. 3.

Referring to FIGS. 1 to 3 showing a preferable embodiment of the present invention, a mouse structure 100 of present invention comprises a housing 1, a first sliding device 2, a second sliding device 3, a linking element 4 and a cover 5 covering a top of the housing 1. The housing 1 comprises a base portion 11 and a tongue portion 12, wherein the base portion 11 has an accommodating space 10 defined therein, a bottom base 13, and an attaching wall 111 defined at a front end of the base portion 11 opposite to the bottom base 13, the bottom base 13 protruding from a lower face of the base portion 11. The tongue portion 12 integrally extends forwardly of the attaching wall 111 and is spaced apart from two opposite sides of the base portion 11. The tongue portion 12 has a guiding slot 121, and two sliding channels 122 formed below the guiding slot 121. The two sliding channels 122 are spaced apart from each other and penetrate upper and lower faces of the tongue portion 12. Both the guiding slot 121 and the sliding channels 122 communicate with the accommodating space 10. In this embodiment, the base portion 11 and the tongue portion 12 together form an arc cross section, and the base portion 11 is tilted at a predetermined angle with respect to a bottom face of the bottom base 13 (as shown in FIG. 4). However, the shape of the housing 1 is not limited thereby.

Figure 5:
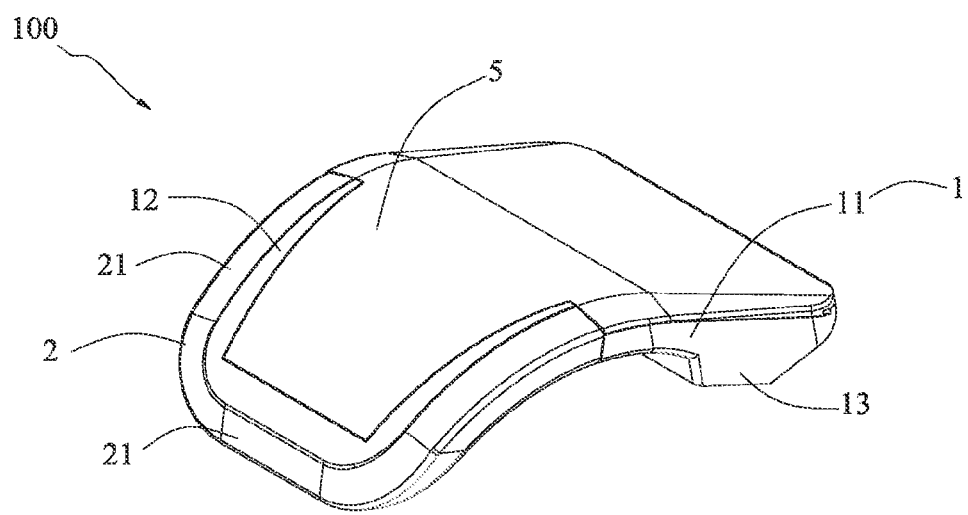
FIG. 5 is an assembly perspective view of FIG. 1.

Referring to FIGS. 3 to 5, the first sliding device 2 is capable of sliding along and fitting together with the tongue portion 12. The first sliding device 2 has a contact portion 21, two sliding arms 22 extending from opposite ends of the contact portion 21 towards the base portion 11, respectively, and a coupling portion 23 being disposed between and connecting the sliding arms 22 at lower portions of the sliding arms 22. The two sliding arms 22 and the contact portion 21 cooperatively form a U-shape. The coupling portion 23 has a pair of coupling elements 231 formed thereon and extending into the sliding channels 122. Each of the sliding arms 22 has a position slot 211 formed at a lower portion of a free end of the sliding arm 22 (as shown in FIG. 2). The attaching wall 111 of the housing 1 has two position pegs 111a protruding forwardly of two opposite ends of the attaching wall 111 and being located adjacent to the tongue portion 12, respectively. The position slots 211 are engageable to the two position pegs 111a.

Figures 6A, 6B:
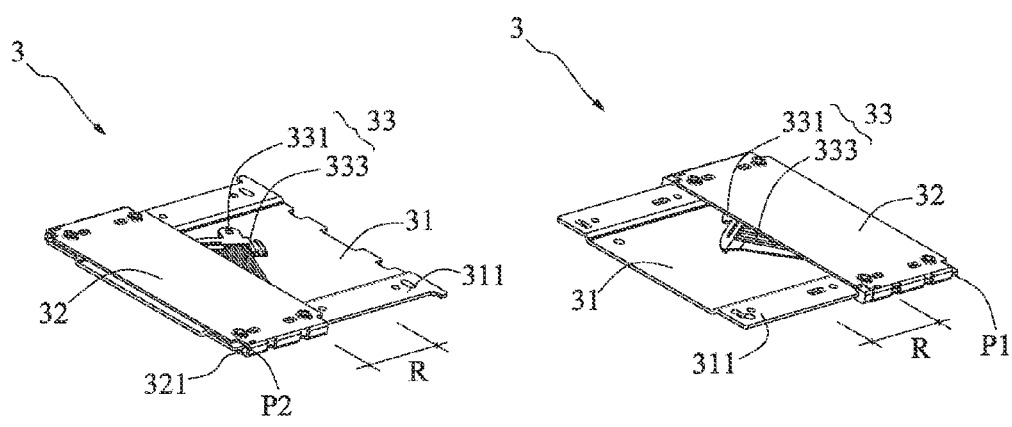
FIG. 6A is a schematic view showing a sliding element of the present invention located at a first position.
FIG. 6B is a schematic view showing the sliding element of the present invention located at a second position.

Referring to FIGS. 2, 6A and 6B, the second sliding device 3 is accommodated in the accommodating space 10 and comprises a base board 31, a sliding element 32, and a resilient apparatus 33, wherein the base board 31 is fixedly disposed on the base portion 11, the sliding element 32 is slidably mounted on the base board 31 and capable of sliding between a first position P1 and a second position P2 (as shown in FIGS. 6A and 6B). The base board 31 is provided with two tracks 311 protruding from two opposite portions of the base board 31, respectively, and opposite sides of the sliding element 32 bend to form two sliding slots 321 having a U-shape and being slidably mounted on the tracks 311, respectively. An upper surface of the base board 31 between the tracks 311 is lower than upper surfaces of the tracks 311 in order to reduce frictional contact with the sliding element 32 and facilitate moving of the sliding element 32. In particular, the resilient apparatus 33 in this embodiment is a spring apparatus and is rotatably disposed between the base board 31 and the sliding element 32. The resilient apparatus 33 has a pivoting end 331, a connecting bar 332, and a resilient portion 333 disposed between the pivoting end 331 and connecting bar 332, wherein the pivoting end 331 is rotatably connected to the base board 31, the connecting bar 332 is connected to the sliding element 32 (as shown in FIG. 6A), and the resilient portion 333 accommodates a plurality of springs 333a being arranged in lows.

Referring to FIGS. 1 and 3, the linking element 4 made of metal material is thin and flat and has first and second linking portions 41, 42 cooperatively form a substantially T-shape. The first linking portion 41 has a pair of linking holes 411 for being correspondingly fastened with the coupling elements 231 of the first sliding device 2 over the sliding channels 122 by screws or other fastening components (not shown). The second linking portion 42 is fixedly attached to the sliding element 32. The linking element 4 is capable of moving along the guiding slot 122 in conjunction with the first sliding device 41.

Referring to FIGS. 5 and 6A, when the mouse structure 1 of the present invention is not in use, the mouse structure 1 is in a close state (as shown in FIG. 5), wherein the sliding element 32 of the second sliding device 3 is located at the first position P1 (as shown in FIG. 6A), and the first sliding device 2 completely fits together with the tongue portion 12, where the contact portion 21 contacts a front end of the tongue portion 12, the position slots 211 are engaged with the two position pegs 111a, and upper and lower faces are in alignment with upper and lower faces of the base portion 11.

Figure 7:
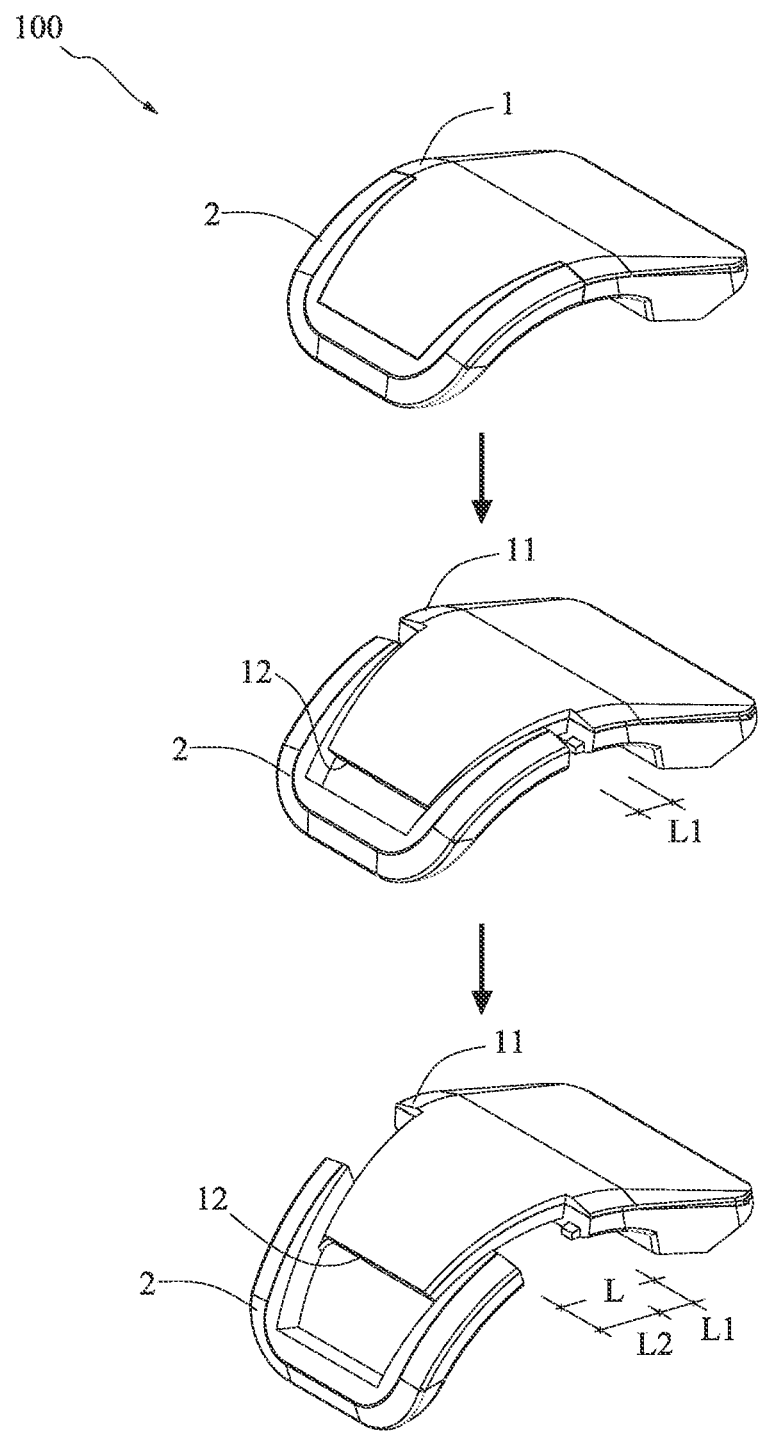
FIG. 7 is a schematic view showing processes of a first sliding device of the present invention sliding a sliding distance.

Referring to FIGS. 6A, 6B and 7, when the mouse structure 100 of the present invention is in use, the first sliding device 2 is being pulled to slide a first slide distance L1, the first linking portion 41 moves in conjunction with the coupling portion 23 to the guiding slot 121 and are being bent accordingly, and the sliding element 32 slides towards the second position P2 in conjunction with the second linking portion 42. Meanwhile the resilient apparatus 33 rotates about the pivoting end 331 in conjunction with moving of the sliding element 32, the connecting bar 332 is accordingly moved to compress the springs 333a of the resilient portion 333, which are therefore deformed until after the resilient apparatus 33 rotates a predetermined curve path R (as shown in FIGS. 6A and 6B), and then the pressure of the springs 333a is released to push the connecting bar 332 outwards, and the sliding element 32 slides forwardly and indirectly drive the first sliding device 2 by the first linking portion 41, whereby the first sliding device 2 automatically slides a second sliding distance L2 (as shown in FIG. 7), and the sliding element 32 reaches the second position P2 (as shown in FIG. 6B). Therefore, the mouse structure 100 is in an open state (as shown in FIGS. 4 and 7) and is ready to be used.

Likewise, to return the mouse structure 100 to the close state is only need to push the first sliding device 2 towards the tongue portion 12, so as to allow the sliding element 32 to leave the second position P2, whereby the resilient apparatus 33 rotates the predetermined cure path R in a reverse direction with respect to the sliding element 32 moving from the first position P1 to the second position P2. Consequently, the sliding element 32 is being pushed outwards by the connecting bar 332 to lineally move to the first position P1.

Accordingly, the mouse structure 100 of the present invention utilizes the cooperation of the arc cross section formed by the tongue portion 12 and the base portion 11, the resilient apparatus 33, and the sliding element 32 to enable the sliding element 32 to slide between the first and second positions P1, P2, whereby the first sliding device 2 is capable of sliding the second sliding distance L2 automatically to be located in either the close or open state. Hence, the mouse structure 100 of the present invention is not only retractable to reduce the physical size by fitting the first sliding device 2 together with the tongue portion 12, but also easy and quick to use by saving more strength to pull or push the first sliding device 2.

It is understood that the invention may be embodied in other forms within the scope of the claims. Thus the present examples and embodiments are to be considered in all respects as illustrative, and not restrictive, of the invention defined by the claims.

What is claimed is:

1. A mouse structure, comprising:
a housing having a base portion and a tongue portion extending from one end of the base portion, the base portion defining an accommodating space therein, the tongue portion having a guiding slot and at least a sliding channel, the guiding slot and the at least a sliding channel communicating with the accommodating space;
a first sliding device capable of sliding along and fitting together with the tongue portion;
a second sliding device comprising a base board, a sliding element, and a resilient apparatus rotatably disposed between the base board and the sliding element, the base board fixedly disposed on the base portion, the sliding element slidably mounted on the base board and capable of sliding between a first position and a second position, the resilient apparatus having a pivoting end, a connecting bar, and a resilient portion disposed between the pivoting end and connecting bar, the pivoting end being rotatably connected to the base board, the connecting bar connected to the sliding element;
a linking element having first and second linking portions, one end of the first linking portion being fastened with the first sliding device over the at least a sliding channel, the second linking portion fixedly attached to the sliding element, the first linking portion capable of moving along the guiding slot in conjunction with the first sliding device; and
a cover covering a top of the housing;
wherein when the first sliding device is in a close state that the first sliding device completely fits together with the tongue portion, the sliding element is located at the first position, and when the first sliding device is being pulled to slide a first slide distance, the linking element moves in conjunction with the first sliding device and drives the sliding element sliding towards the second position, and meanwhile the resilient apparatus rotates about the pivoting end in conjunction with the sliding element, the resilient portion therefore being compressed and deformed by the connecting bar until after the resilient apparatus rotates a predetermined curve path, the sliding element being pushed by the connecting bar when the resilient portion is not compressed, whereby the first sliding device automatically sliding a second sliding distance, and the sliding element reaching the second position.

2. The mouse structure of claim 1, wherein the base portion and the tongue portion of the housing cooperatively form an arc cross section, the first sliding device has a contact portion, sliding arms extending from opposite ends of the contact portion towards the base portion, respectively, and a coupling portion being disposed between and connecting the sliding arms, the sliding arms having an arc cross section.

3. The mouse structure of claim 2, wherein the sliding element of the second sliding device moves lineally on the base board.

4. The mouse structure of claim 2, wherein the tongue portion has two the sliding channels spaced apart from each other, the coupling portion of the first sliding device has a pair of coupling elements located with respect to the sliding channels, and the first linking portion of the linking element has a pair of linking holes for being coupled with the pair of coupling elements.

5. The mouse structure of claim 2, wherein an attaching wall is defined at a front end of the base portion of the housing, and the tongue portion integrally extends forwardly of the attaching wall and is spaced apart from two opposite sides of the base portion.

6. The mouse structure of claim 5, wherein two position pegs protrude forwardly of two opposite ends of the attaching wall and are located adjacent to the tongue portion, respectively, and the sliding arms of the first sliding device are formed with two position slots corresponding to and being engageable to the two position pegs.

7. The mouse structure of claim 1, wherein tracks are protruded from opposite portions of the base board, respectively, and opposite sides of the sliding element respectively bend to form a sliding slot having a U-shape and being slidably mounted on respective track.

8. The mouse structure of claim 1, wherein the resilient portion of the resilient apparatus has a plurality of springs.

9. The mouse structure of claim 1, wherein the linking portion is made of metal material and is thin and flat.

10. The mouse structure of claim 1, wherein when the first sliding device is in the close state, upper and lower faces of the first sliding device are in alignment with upper and lower faces of the base portion.

* * * * *